United States Patent
Jahan et al.

(10) Patent No.: US 10,914,812 B2
(45) Date of Patent: Feb. 9, 2021

(54) METHOD FOR LOCATING SOURCES EMITTING ELECTROMAGNETIC PULSES

(71) Applicant: THALES, Courbevoie (FR)

(72) Inventors: Daniel Jahan, Brest (FR); Romain Giacometti, Brest (FR); Cédric Cornu, Brest (FR)

(73) Assignee: THALES, Courbevoie (FR)

( * ) Notice: Subject to any disclaimer, the term of this patent is extended or adjusted under 35 U.S.C. 154(b) by 309 days.

(21) Appl. No.: 16/001,950

(22) PCT Filed: Dec. 15, 2016

(86) PCT No.: PCT/EP2016/081272
§ 371 (c)(1),
(2) Date: Jun. 7, 2018

(87) PCT Pub. No.: WO2017/102994
PCT Pub. Date: Jun. 22, 2017

(65) Prior Publication Data
US 2019/0064313 A1     Feb. 28, 2019

(30) Foreign Application Priority Data
Dec. 15, 2015  (FR) ...................................... 15 02594

(51) Int. Cl.
*G01S 5/02*  (2010.01)
*G01S 11/02*  (2010.01)
(Continued)

(52) U.S. Cl.
CPC .............. *G01S 5/0273* (2013.01); *G01S 5/12* (2013.01); *G01S 11/02* (2013.01); *G01S 11/04* (2013.01)

(58) Field of Classification Search
CPC .... G01S 5/0273; G01S 5/0215; G01S 5/0218; G01S 5/12; G01S 11/02; G01S 11/04; G01S 13/003
See application file for complete search history.

(56) References Cited

U.S. PATENT DOCUMENTS 4,918,455 A * 4/1990 Maier ..................... G01S 7/021
                                                        342/13
5,327,145 A * 7/1994 Jelinek ..................... G01S 5/10
                                                        342/126

(Continued)

FOREIGN PATENT DOCUMENTS

EP          2428810 A1    3/2012
WO     2014001651 A1    1/2014

OTHER PUBLICATIONS

French Patent Application 15 02594, Rapport de Recherche Préliminaire, Sep. 6, 2016, 2 pages.

*Primary Examiner* — Cassi J Galt
(74) *Attorney, Agent, or Firm* — Soquel Group LLC

(57) ABSTRACT

The present invention relates to a method for locating sources emitting electromagnetic pulses, each source belonging to a carrier platform, the method comprising the following steps:
receiving, by a detector, for each source to be located, at least one same emitted pulse, received directly and received by reflection on the carrier platform of another source,
measuring the arrival direction, the arrival date and at least one invariant characteristic of each received pulse.
The method further comprises the following steps:
grouping together a first pair of pulses and a second pair of pulses,
calculating the difference of dates of arrival between the pulses of each pair, (Continued)

Figure 1:
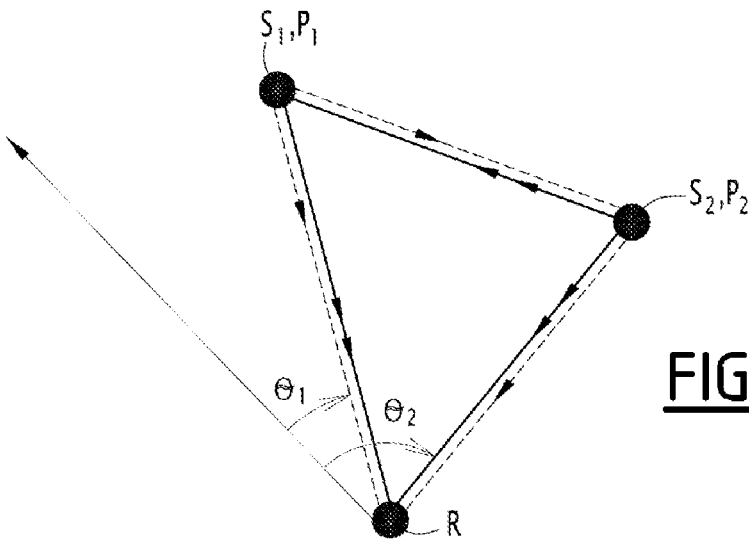

determining the direction and the distance of each source from the detector from calculated differences of dates of arrival of the pulses of each pair.

7 Claims, 1 Drawing Sheet

(51) Int. Cl.
*G01S 5/12* (2006.01)
*G01S 11/04* (2006.01)

(56) References Cited

U.S. PATENT DOCUMENTS 7,411,539 B2 * 8/2008 Valand .................... G01S 7/021
 342/13
2011/0140966 A1 6/2011 Ferreol et al.

* cited by examiner

METHOD FOR LOCATING SOURCES EMITTING ELECTROMAGNETIC PULSES

The present invention relates to a method for locating at least two sources emitting electromagnetic pulses, the method comprising the following steps:

receiving, by a detector, for each source to be located, for an operating duration of the detector, at least one same emitted pulse, received on the one hand directly and received on the other hand by reflection on the carrier platform of another source, measuring the arrival direction, the arrival date and at least one invariant characteristic of each received pulse.

The location of a source consists of determining the direction and distance of the source relative to a reference point. Such a location is generally based on a multi-offset principle consisting of observing the source from different angles.

To locate a source, one known method, using the principle of triangulation, consists of measuring the direction of arrival of the pulses emitted by the source using several detectors, delocalized from one another. Triangulation is a technique making it possible to determine the position of a point by measuring the angles between this point and other reference points whose position is known.

However, such a method requires using a network of detectors, and therefore necessarily a coordination system for the detectors of the network, which, aside from the cost related to the number of detectors, rules out the possibility of working with a single detector.

A location method has also been developed consisting of arranging a single receiver on a carrier having a relatively high movement speed with respect to the source to be located. Such a relative movement makes it possible to obtain a set of arrival directions over time, the meeting point of which is where the source is located.

However, obtaining a relative movement requires a particularly swift carrier relative to the sources to be located, which makes the method unsuitable in the case of a moving source.

Another known method is based on measuring differences in passage times of antenna beams (DPTAB).

Nevertheless, such measurements assume knowledge of the rotation speed of the antenna beam and therefore the performance of circular sweeping, which involves a relatively slow acquisition.

It is also known to use the time difference of arrival (abbreviated TDOA) of a same signal arriving at two different reception points to locate a source. Such a time difference makes it possible to determine the geometric place where the source is located.

However, here again, at least two detectors are necessary, which rules out the possibility of working with a single detector.

Methods combining TDOA and DPTAB measurements from a single detector are also known.

Conversely, as previously explained, DPTAB measurements require circular sweeping, which is both slow and uncertain.

There is therefore a need for a method for locating sources from a single receiver that is quasi-static relative to the sources to be located.

To that end, the invention relates to a location method of the aforementioned type, wherein the method further comprises the following steps:

grouping together at least a first pair of pulses of invariant characteristics equal to a first invariant characteristic and of different directions of arrival, and at least one second pair of pulses of invariant characteristics equal to a second invariant characteristic and of same different directions of arrival, calculating the difference of dates of arrival between the pulses of each pair, determining the direction and the distance of each source from the detector based on the calculated differences of dates of arrival of the pulses of each pair.

According to specific embodiments, the location method comprises one or more of the following features, considered alone or according to any technically possible combinations:

the operating duration is made up of time brackets with identical durations, the method comprising defining a sliding duration at least equal to the duration of a time bracket, the grouping step being carried out over a sliding duration, the pulses of each pair belonging to the same time bracket.

the method further comprises, for each time bracket, a step for sorting the received pulses based on the direction of arrival and on at least one invariant characteristic chosen from among the measured characteristic(s) of each pulse, to obtain sets of pulses, the pulses of each set having equal directions of arrival and equal invariant characteristics, the pulses of each set being grouped together in a same pair during the grouping step.

the determination step comprises calculating a histogram, for each pair, on the basis of the differences of dates of arrival calculated for said pair and determining a main lag on the basis of the calculated histogram, the direction and the distance of each source from the detector being calculated based on the determined main lags.

the determination step further comprises comparing the value of each main lag relative to a range of reference values and comparing the number of occurrences relative to each main lag with respect to a reference threshold, the determination step also comprising eliminating main lags whose value is not comprised in the reference value range and for which the number of occurrences is strictly below the reference threshold.

each grouped first pair and second pair makes it possible to determine the respective distances of two of the sources to be located from the detector, said distances being calculated from the following functions:

$$d_1 = \frac{c}{4}\left((\tau_{P1} - \tau_{P2}) + \sqrt{(\tau_{P1} - \tau_{P2})^2 + \frac{(8\tau_{P1}\tau_{P2})}{(1 - \cos(\theta_1 - \theta_2))}}\right)$$

$$d_2 = \frac{c}{4}\left(3(\tau_{P1} - \tau_{P2}) + \sqrt{(\tau_{P1} - \tau_{P2})^2 + \frac{(8\tau_{P1}\tau_{P2})}{(1 - \cos(\theta_1 - \theta_2))}}\right)$$

where
$d_1$ is the distance of the first source $S_1$ from the detector R,
$d_2$ is the distance of the second source $S_2$ from the detector R,
c is the propagation speed of the waves,
$\tau_{P1}$ is the first main lag relative to the path difference between the received reflected pulses and the received direct pulses, derived from the same pulses emitted by the first source $S_1$,
$\tau_{P2}$ is the second main lag relative to the path difference between the received reflected pulses and the received direct pulses, derived from the same pulses emitted by the second source $S_2$, $\theta_1$ is the direction of arrival of the pulses emitted by the first source $S_1$, and $\theta_2$ is the direction of arrival of the pulses emitted by the second source $S_2$.

the direction of each source is the direction of arrival of the pulses of a set of at least one pair in advance relative to the pulses of the other set of the pair.

the method further comprises a step for minimizing a cost function.

the invariant characteristics of each pulse comprise at least one of the features from among: the width of the pulse, the carrier frequency of the pulse and the intentional intra-pulse modulation.

The invention also relates to a device for locating at least two electromagnetic pulse emission sources, the detector being able to carry out the steps of the method as defined above.

Figure 2:
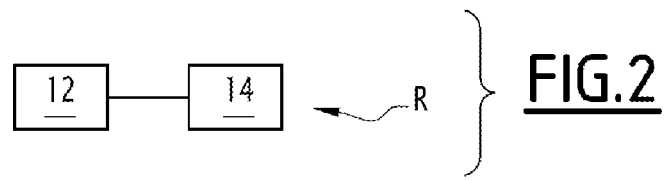
Figure 3:
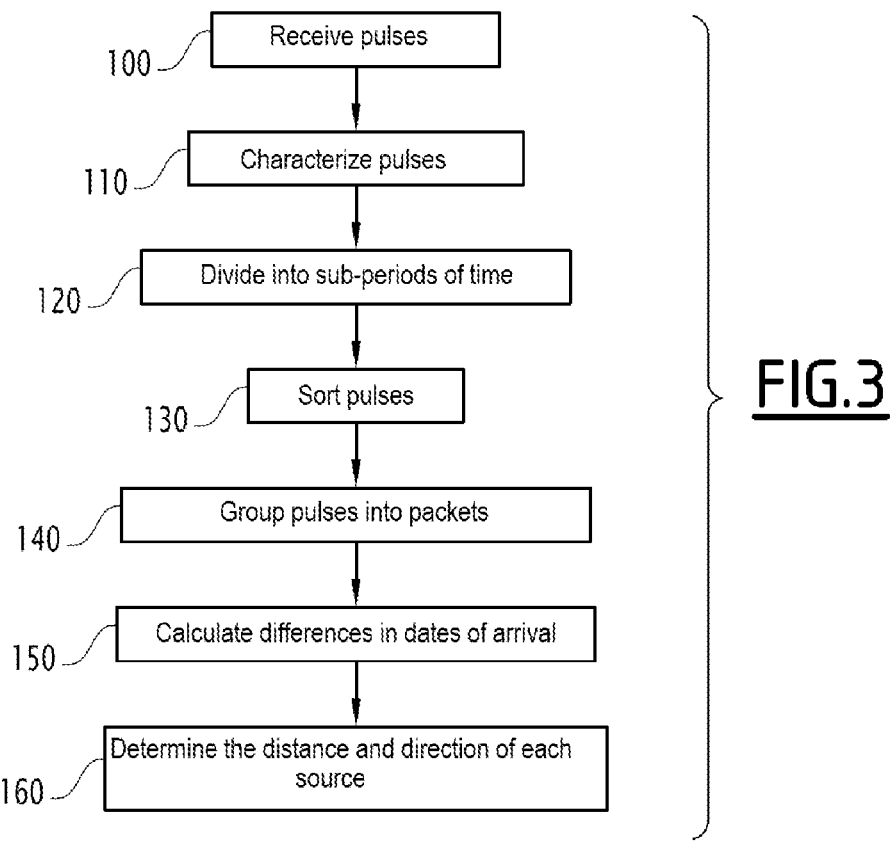

Other features and advantages of the invention will appear upon reading the following description of embodiments of the invention, solely as an example and done in reference to the drawings, which are:

FIG. 1, a schematic view of an example of sources to be located and a detector intended to locate such sources, FIG. 2, a schematic and functional view of the detector of FIG. 1, and FIG. 3, a flowchart of one example implementation of a method for locating sources.

One general principle for implementing the invention is described hereinafter, based on FIG. 1.

To that end, two sources emitting periodic electromagnetic pulses $S_1$ and $S_2$, respectively placed on practically periodic and reflective carrier platforms $P_1$ and $P_2$, are considered. "Practically periodic" means that the emission point of each emission source $S_1$, $S_2$ is considered to be combined with the reflection point of the platform $P_1$, $P_2$ on which said source $S_1$, $S_2$ is placed.

The sources $S_1$ and $S_2$ are for example radar emission sources, i.e., modulated electromagnetic emission sources, and more particularly pulse-modulated. The sources $S_1, \ldots, S_n$ to be located are for example arranged at sea on ships delocalized from one another.

One aim of the invention is to locate said sources $S_1$ and $S_2$ using a single radar detector R placed at a distance from the sources $S_1$ and $S_2$, as illustrated by FIG. 1. "Locate a source" means determining the direction and distance of the source from the detector.

The radar detector R perceives the signal $x_1$ corresponding to the pulse emitted by the first source $S_1$ directly, i.e., after having traveled the path $S_1R$. This signal is characterized by characteristics $a_1$, a date of arrival $t_1$ and a direction of arrival $\theta_1$ measured by the detector R.

The radar detector R also perceives the signal $x_{12}$ corresponding to the same pulse emitted by the first source $S_1$ and reflected on the platform $P_2$ of the second source $S_2$, i.e., after having traveled the path $S_1S_2+S_2R$. This signal is characterized by characteristics $a_{12}$, a date of arrival $t_{12}$ and a direction of arrival $\theta_2$ measured by the detector R.

The radar detector R also perceives the signal $x_2$ corresponding to the pulse emitted by the second source $S_2$ directly, i.e., after having traveled the path $S_2R$. This signal is characterized by characteristics $a_2$, a date of arrival $t_2$ and a direction of arrival $\theta_2$ measured by the detector R.

The radar detector R also perceives the signal $x_{21}$ corresponding to the same pulse emitted by the second source $S_2$ and reflected on the platform $P_1$ of the first source $S_1$, i.e., after having traveled the path $S_2S_1+S_1R$. This signal is characterized by characteristics $a_{21}$, a date of arrival $t_{21}$ and a direction of arrival $\theta_1$ measured by the detector R.

The radar detector R therefore perceives the following four signals: $x_1$ ($a_1$, $\theta_1$, $t_1$), $x_{12}$ ($a_{12}$, $\theta_2$, $t_{12}$), $x_2$ ($a_2$, $\theta_2$, $t_2$) and $x_{21}$ ($a_{21}$, $\theta_1$, $t_{21}$).

From the signals $x_1$ ($a_1$, $\theta_1$, $t_1$) and $x_{12}$ ($a_{12}$, $\theta_2$, $t_{12}$), it deduces the difference in time of arrival $\tau_1$ of the pulses relative to the first source $S_1$, from the two measurements of dates of arrival $t_1$ and $t_{12}$, or therefore $\tau_1 = t_{12} - t_1$. Said difference in time of arrival $\tau_1$ corresponds to the journey $S_1S_2 + S_2R - S_1R$.

From the signals $x_2$ ($a_2$, $\theta_2$, $t_2$) and $x_{21}$ ($a_{21}$, $\theta_1$, $t_{21}$), it deduces the difference in time of arrival $\tau_2$ of the pulses relative to the second source $S_2$, from the two measurements of dates of arrival $t_2$ and $t_{21}$, or therefore $\tau_2 = t_{21} - t_2$. The difference in time of arrival $\tau_2$ corresponds to the journey $S_2S_1 + S_1R - S_2R$.

The application of the cosine theorem to the triangle $S_1RS_2$ makes it possible to write the following equation:

$$d_{12}^2 = d_1^2 + d_2^2 - 2d_1d_2\cos(\theta_1 - \theta_2) \quad (1)$$

Where $d_1$ is the distance between the first source $S_1$ and the detector R, $d_2$ is the distance between the second source $S_2$ and the detector R, and $d_{12}$ is the distance between the first source $S_1$ and the second source $S_2$.

From the differences in time of arrival $\tau_1$ and $\tau_2$ and considering that c is the propagation speed of the waves, the following equations (2) and (3) are obtained:

$$c\tau_1 = d_{12} + d_2 - d_1 \quad (2)$$

$$c\tau_2 = d_{12} + d_1 - d_2 \quad (3)$$

By adding and subtracting the two equations (2) and (3), the following expressions (4) and (5) are obtained.

$$d_{12} = c\frac{\tau_1 + \tau_2}{2} \quad (4)$$

$$d_2 = d_1 + c\frac{\tau_1 - \tau_2}{2} \quad (5)$$

By introducing the expressions (4) and (5) into equation (1) derived from the cosine theorem, the following equation (6) is obtained:

$$\left(c\frac{\tau_1 + \tau_2}{2}\right)^2 = d_1^2 + \left(d_1 + c\frac{\tau_1 - \tau_2}{2}\right)^2 - 2d_1\left(d_1 + c\frac{\tau_1 - \tau_2}{2}\right)\cos(\theta_1 - \theta_2) \quad (6)$$

By resequencing equation (6), a second degree equation (7) in $d_1$ is obtained:

$$2d_1^2 + c(\tau_1 - \tau_2)d_1 - \frac{c^2\tau_1\tau_2}{(1 - \cos(\theta_1 - \theta_2))} = 0 \quad (7)$$

The discriminant of equation (7) still being positive, equation (7) has two separate true roots (8):

$$d_1 = \frac{c}{4}\left((\tau_1 - \tau_2) \pm \sqrt{(\tau_1 - \tau_2)^2 + \frac{8\tau_1\tau_2}{(1 - \cos(\theta_1 - \theta_2))}}\right) \quad (8)$$

Given that $$(\tau_1 - \tau_2)^2 + \frac{8\tau_1\tau_2}{(1-\cos(\theta_1-\theta_2))} > (\tau_1 - \tau_2)^2,$$

there is only one positive root given by the following expression (9) and corresponding to the distance between the first source $S_1$ and the detector R:

$$d_1 = \frac{c}{4}\left((\tau_1 - \tau_2) + \sqrt{(\tau_1 - \tau_2)^2 + \frac{8\tau_1\tau_2}{(1-\cos(\theta_1-\theta_2))}}\right) \quad (9)$$

By introducing expression (9) into expression (5), the distance between the second source $S_2$ and the detector R is obtained:

$$d_2 = \frac{c}{4}\left(3(\tau_1 - \tau_2) + \sqrt{(\tau_1 - \tau_2)^2 + \frac{8\tau_1\tau_2}{(1-\cos(\theta_1-\theta_2))}}\right) \quad (10)$$

Thus, the sources $S_1$ and $S_2$ have indeed been located in polar coordinates, respectively $(d_1, \theta_1)$ and $(d_2, \theta_2)$.

This principle can be generalized to a system comprising N periodic emission sources $S_1, \ldots, S_N$ respectively placed on practically periodic and reflective platforms $P_1, \ldots, P_N$. Such an assembly can be broken down into $$C_N^2 = \frac{N!}{2(N-2)!}$$

different $S_iRS_j$ triangles.

A first method consists of processing each triangle $S_iRS_j$ separately. Such a first method results in calculating $C_N^2$ pairs of distances $(d_i, d_j)$ with i=1 at N and j=1 at N still greater than i. This method yields N−1 estimates of $d_i$.

A second method consists of minimizing a cost function globally, i.e., simultaneously taking all variables into account. To ensure a faster convergence of this second iterative method, the latter can be initialized with values obtained using the first method.

The detector R for locating sources $S_1, \ldots, S_n$ emitting electromagnetic pulses, working on the principle previously described, is functionally illustrated by FIG. 2.

The detector R is a radar detector.

The detector R is quasi-static relative to the sources $S_1, \ldots, S_n$ to be located, i.e., the detector R has, at most, a relatively low speed relative to the sources $S_1, \ldots, S_n$ to be located, such that the geometric evolutions, relative to the first source—second source—detector triangles, are inferior enough to the desired precision not to affect it.

The detector R comprises a receiving module 12 and a computer 14.

The receiving module 12 comprises an array of goniometry antennas forming a single detector considered to be periodic, a set of reception chains associated with the antenna array and processing functions making it possible to measure characteristics of the received pulses.

The characteristics of the pulses measured by the receiving module 12 are for example the direction of arrival of the pulses, the carrier frequency of the pulses, the width of the pulses, the date of arrival of the pulses, the intentional modulation on pulse, or the power of the pulses.

The computer 14 interacts with the receiving module 12.

The computer 14 for example comprises a processor, a memory and a data processing unit. The data processing unit is configured to carry out, in interaction with a computer program product, able to be loaded in the data processing unit, a location method that will be described in more detail in the rest of the description.

An example of operation of the detector R is now described in reference to FIG. 3, which schematically shows a flowchart of the implementation of a method for locating sources $S_1, \ldots, S_n$ emitting electromagnetic pulses.

In the rest of the description, the term "equal" means "equal to within an allowance". The selected allowance is related to the measuring precisions, the measuring signal-to-noise ratio and the frequency of the signals received on the detector R. The chosen allowance is for example ±5 percent (%).

For each source $S_1, \ldots, S_n$ to be located, the determination method initially comprises a step 100 for reception by the detector R of at least one emitted pulse, on the one hand received directly, i.e., along the path going directly from the source to the detector, and on the other hand received in its reflected form, i.e., after reflection on the platform of another source. Only the difference in geometric paths, which causes different dates of arrival, and the quality of the reflection make it possible to differentiate the pulse received directly from the pulse received reflected when these received pulses come from the same emission.

The pulses are received by the detector R during the operating duration of the detector R.

In particular, when only two sources need to be located, as illustrated by FIG. 1, the detector R receives a first burst of pulses, in dotted lines, emitted directly by the first source $S_1$, a second burst of pulses, in solid lines, emitted directly by the second source $S_2$, a third burst of pulses, in dotted lines, emitted by the first source $S_1$ and reflected on the platform $P_2$ of the second source $S_2$ and a fourth burst of pulses, in solid lines, emitted by the second source $S_2$ and reflected on the platform $P_1$ of the first source $S_1$.

Next, the location method comprises a step 110 for measuring, by the detector R, the direction of arrival $\theta_1, \ldots, \theta_n$, the date of arrival $t_1, \ldots, t_n$ on the detector R and at least one invariant characteristic $C_1, \ldots, C_n$ of each received pulse.

The invariant characteristics $C_1, \ldots, C_n$ of each pulse comprise at least one of the features from among: the width of the pulse, the carrier frequency of the pulse and the intentional intra-pulse modulation.

The location method next comprises a step 120 for dividing the operating duration into time brackets $\Delta t_1, \ldots, \Delta t_k$ with a same duration.

The duration of each time bracket $\Delta t_1, \ldots, \Delta t_k$ is related to the maximum illumination duration at 3 dB of the readers. For example, the duration of each time bracket is comprised between 10 milliseconds (ms) and 100 ms.

The location method advantageously comprises, for each time bracket $\Delta t_1, \ldots, \Delta t_k$, a step 130 for sorting pulses received during the time bracket $\Delta t_1, \ldots, \Delta t_k$, based on the direction of arrival $\theta_1, \ldots, \theta_n$ and at least one invariant characteristic $C_1, \ldots, C_n$ chosen from among the measured characteristics of each pulse. At the end of the sorting step 130, sets E of pulses are obtained.

The pulses of each set E have equal directions of arrival $\theta_1, \ldots$, and equal invariant characteristics $C_1, \ldots, C_n$. As a result, each set E is characterized by a time bracket $\Delta t_1, \ldots, \Delta t_k$, a direction of arrival $\theta_1, \ldots, \theta_n$ and at least one invariant characteristic $C_1, \ldots, C_n$.

The location method next comprises a step 140 for grouping together sets E, over a sliding duration $T_G$, by packets P of four sets $E_1(C_1,\theta_1,\Delta t_{f1})$, $E_2(C_1,\theta_2,\Delta t_{f1})$, $E_3(C_2, \theta_1,\Delta t_{f2})$, $E_4(C_2,\theta_2,\Delta t_{f2})$ corresponding to a first and second direction of arrival $\theta_1$, $\theta_2$ with different values from one another, a first and second invariant characteristic $C_1$, $C_2$ with different values from one another and to a maximum of two time brackets $\Delta t_{f1}$, $\Delta t_{f2}$ The sliding duration $T_G$ is at least equal to the duration of a time bracket.

More specifically, each packet P comprises a first pair of sets $E_1(C_1,\theta_1,\Delta t_{f1})$ and $E_2(C_1,\theta_2,\Delta t_{f1})$ of invariant characteristics equal to the first invariant characteristic $C_1$ of the packet P, of different directions of arrival $\theta_1$, $\theta_2$ and belonging to the same time bracket $\Delta t_{f1}$, and a second pair of sets $E_3(C_2,\theta_1,\Delta t_{f2})$ and $E_4(C_2,\theta_2,\Delta t_{f2})$ of invariant characteristics equal to the second invariant characteristic $C_2$ of the packet P, of different directions of arrival $\theta_1$, $\theta_2$ and belonging to the same time bracket $\Delta t_{f2}$.

Each pair of sets $(E_1(C_1,\theta_1,\Delta t_{f1})$, $E_2(C_1,\theta_2,\Delta t_{f1}))$ and $(E_3(C_2,\theta_1,\Delta t_{f2})$, $E_4(C_2,\theta_2,\Delta t_{f2}))$ groups together the pulses received directly and reflected by the detector R and derived from the same emission.

The sliding duration $T_G$ is a sliding analysis window. This involves taking account of the received pulses, having already been sorted by time brackets $\Delta t_1, \ldots, \Delta t_k$, over a duration such that it is possible to detect direct pulses and reflected pulses. Indeed, the radiation of the sources being directive, it must sweep the space to cover it. Illumination conditions are then necessary to manage to detect a same emitted pulse received directly and received reflected.

As a result, the sliding duration $T_G$ is a duration at least equal to the largest of the antenna sweeping periods of the sources to be located. This makes it possible to make sure to obtain the illumination of the reflectors in the considered time period. The sliding duration $T_G$ therefore corresponds to a large number of time brackets $\Delta t_1, \ldots, \Delta t_k$.

The sliding duration $T_G$ is for example comprised between 1 second (s) and 10 seconds.

Alternatively, the sliding duration $T_G$ corresponds to several passages of antenna beams, i.e., several antenna sweeping periods of the sources to be located. This makes it possible to work on more pulses to consolidate the measurements, as long as this extension of the analysis time does not correspond to an excessive evolution of the geometry in light of the targeted precisions.

Then, the method comprises a step 150 for calculating, for each pair of each packet P, differences of dates of arrival between the pulses of one of the sets E of the pair and the pulses of the other set E of the pair. Such differences of dates of arrival result from differences in geometric paths between the received direct pulses and the received reflected pulses derived from the same emitted pulses.

The method next comprises a step 160 for determining the direction $\Theta$ and the distance d of each source $S_1, \ldots, S_n$ from the detector R from calculated differences in the dates of arrival.

In particular, the determination step 160 comprises a first phase for calculating a histogram, for each pair, from calculated differences of dates of arrival.

Each histogram makes it possible to determine a main lag $\tau_p$.

For example, when the pulse repetition interval (PRI) of the signals received on the detector R is strictly greater than twice an expected lag value, the main lag $\tau_p$ is the smallest difference of date of arrival among the differences of date of arrival of the histogram. The pulse repetition interval refers to the duration between two successive pulses of a same signal. The expected lag value is a value estimated as a function of the expected geometric configuration of the first source-second source-detector triangles.

In another example, when the pulse repetition interval of the signals received on the detector R is less than or equal to twice the expected lag value, the determination step 160 comprises identifying pulses received directly on the one hand and pulses received after reflection on the platform of another emission source on the other hand. The differences of date of arrival are next calculated only between the pulses received reflected relative to the pulses received directly and not between the pulses received directly relative to the pulses received reflected. The main lag $\tau_p$ is then the smallest difference of date of arrival among the differences of date of arrival calculated among the pulses received reflected relative to the pulses received directly.

Preferably, the determination step 160 next comprises a second phase for comparing values of each main lag $\tau_p$ determined relative to a range of reference values. The range of reference values is for example chosen based on geometric considerations, related to the the directions of arrival and plausible distance hypotheses in the ranges of interest. The range of reference values for example extends, broadly speaking, between 1 microsecond (µs) and 100 µs.

Advantageously, the second phase also comprises comparing the number of occurrences relative to each determined main lag $\tau_p$ relative to a reference threshold. The reference threshold is for example chosen based on a percentage of the number of direct pulses received for each pair.

During the second phase, the main lags $\tau_p$ whose values are not comprised in the reference value range and for which the number of occurrences is strictly below the reference threshold, are eliminated.

The second phase therefore makes it possible to eliminate aberrant values when the obtained main lag $\tau_p$ is outside the plausible value range and isolated and insignificant values when the number of occurrences is below the reference threshold.

Then, the determination step 160 comprises a third phase for determining the direction $\Theta$ of the source corresponding to each pair.

The direction of the source $S_1$, $S_2$ of each pair is the direction of arrival $\theta_1$, $\theta_2$ of the pulses of the sets E of the pair in advance relative to the pulses of the other set E of the pair. The corresponding direction of arrival $\Theta$ is therefore the angle of the direct emission of the pulses.

The determination step 160 also comprises a fourth phase for calculating the distance d between the detector R and each of the first and second source $S_1$, $S_2$ corresponding to the two pairs of each packet P. For this, the following functions (11) and (12), deduced from expressions (9) and (10), are for example used:

$$d_1 = \frac{c}{4}\left((\tau_{P1} - \tau_{P2}) + \sqrt{(\tau_{P1} - \tau_{P2})^2 + \frac{(8\tau_{P1}\tau_{P2})}{(1 - \cos(\theta_1 - \theta_2))}}\right) \quad (11)$$

$$d_2 = \frac{c}{4}\left(3(\tau_{P1} - \tau_{P2}) + \sqrt{(\tau_{P1} - \tau_{P2})^2 + \frac{(8\tau_{P1}\tau_{P2})}{(1 - \cos(\theta_1 - \theta_2))}}\right) \quad (12)$$

where $d_1$ is the distance of the first source $S_1$ from the detector R, $d_2$ is the distance of the second source $S_2$ from the detector R, c is the propagation speed of the waves, $\tau_{P1}$ is the first main lag relative to the path difference between the received reflected pulses and the received direct pulses, derived from the same pulses emitted by the first source $S_1$, $\tau_{P2}$ is the second main lag relative to the path difference between the received reflected pulses and the received direct pulses, derived from the same pulses emitted by the second source $S_2$, $\theta_1$ is the direction of arrival of the pulses emitted by the first source $S_1$, and $\theta_2$ is the direction of arrival of the pulses emitted by the second source $S_2$.

Thus, each source $S_1, \ldots, S_n$ is located in polar coordinates $(d, \Theta)$.

The described method therefore makes it possible to locate sources $S_1, \ldots, S_n$ from a single quasi-static detector relative to the sources to be located.

The method solves the first source—second source—detector triangle solely through measurements of the direction of arrival and time difference of arrival (TDOA) starting from the principle that the platforms carrying the sources are known reflectors and, to that end, the emission source and reflection point are combined for a same platform. This hypothesis is realistic and allows a simple resolution of the first source—second source—detector triangle without using a long and delicate DPTAB. Such a method is therefore carried out quickly while allowing a precise location of the sources.

Furthermore, the method is based on measurements traditionally done, in particular the direction of arrival of the pulses, the date of arrival of the pulses, the width of the pulses, the carrier frequency of the pulses, which is an asset for facilitating the integration of the method into a radar detector.

Furthermore, the method can be generalized to N sources on N carrier platforms, for example, through a decomposition into a combination of two among N triangles on which the same location method is applied.

As an optional addition, when several sources must be located, an additional step consists of minimizing a cost function simultaneously taking account of all of the variables. Such a cost function makes it possible to improve the precision of the distances d and directions $\Theta$ determined for each source $S_1, \ldots, S_n$.

The invention claimed is:

1. A method for locating at least two sources emitting electromagnetic pulses, each source belonging to a carrier platform, the method comprising:

receiving, by a detector, for each source to be located, during an operating duration of the detector, at least one same emitted pulse, received on the one hand directly and received on the other hand by reflection on the carrier platform of another source, the operating duration being comprised of time brackets with identical durations;

measuring the arrival direction, the arrival date and at least one invariant characteristic of each received pulse;

for each time bracket sorting the received pulses based on the measured arrival directions and on at least one invariant characteristic chosen from among the at least one measured invariant characteristic of each pulse, to obtain sets of pulses, the pulses of each set having equal arrival directions and equal invariant characteristics;

defining a sliding duration at least equal to the duration of a time bracket;

grouping together, over the sliding duration, at least a first pair of sets of pulses of invariant characteristics equal to a first invariant characteristic and of different directions of arrival, and at least one second pair of sets of pulses of invariant characteristics equal to a second invariant characteristic and of the same different directions of arrival, wherein the pulses of each pair of sets belong to a same time bracket;

calculating, for each grouped pair of sets of pulses, differences of dates of arrival between the pulses of the sets of each pair; and determining the direction and the distance of each source from the detector based on the calculated differences.

2. The method according to claim 1, wherein said determining the direction and the distance comprises:

calculating a histogram, for each pair of sets, based on the differences of dates of arrival calculated for the pair of sets; and determining a main lag based on each calculated histogram, the direction and the distance of each source from the detector being calculated based on the determined main lags.

3. The method according to claim 2, wherein said determining the direction and the distance further comprises:

comparing the value of each main lag relative to a range of reference values;

further comparing the number of occurrences relative to each main lag with respect to a reference threshold; and eliminating main lags whose values are not comprised in the reference value range and for which the number of occurrences is strictly below the reference threshold.

4. The method according to claim 2, wherein each grouped first pair of sets and second pair of sets makes it possible to determine respective distances of two of the sources to be located from the detector, the distances being calculated from the following functions:

$$d_1 = \frac{c}{4}\left((\tau_{P1} - \tau_{P2}) + \sqrt{(\tau_{P1} - \tau_{P2})^2 + \frac{(8\tau_{P1}\tau_{P2})}{(1 - \cos(\theta_1 - \theta_2))}}\right)$$

$$d_2 = \frac{c}{4}\left(3(\tau_{P1} - \tau_{P2}) + \sqrt{(\tau_{P1} - \tau_{P2})^2 + \frac{(8\tau_{P1}\tau_{P2})}{(1 - \cos(\theta_1 - \theta_2))}}\right)$$

where $d_1$ is the distance of the first source $S_1$ from the detector R, $d_2$ is the distance of the second source $S_2$ from the detector R, c is the propagation speed of the waves, $\tau_{P1}$ is the first main lag relative to the path difference between the received reflected pulses and the received direct pulses, derived from the same pulses emitted by the first source $S_1$, $\tau_{P2}$ is the second main lag relative to the path difference between the received reflected pulses and the received direct pulses, derived from the same pulses emitted by the second source $S_2$, $\theta_1$ is the direction of arrival of the pulses emitted by the first source $S_1$, and $\theta_2$ is the direction of arrival of the pulses emitted by the second source $S_2$.

5. The method according to claim 1, wherein the direction of each source is the direction of arrival of the pulses of a set of at least one pair in advance relative to the pulses of the other set of the pair.

6. The method according to claim 1, wherein the invariant characteristics of each pulse comprise at least one of the features from among: a width of the pulse, a carrier frequency of the pulse, and an intentional intra-pulse modulation.

7. A non-transitory computer readable medium storing instructions which, when executed by a processor of a detector for locating at least two electromagnetic pulse emission sources, cause the processor to carry out a method according to claim 1.

* * * * *